United States Patent [19]

Walker et al.

[11] Patent Number: 5,797,127
[45] Date of Patent: Aug. 18, 1998

[54] METHOD, APPARATUS, AND PROGRAM FOR PRICING, SELLING, AND EXERCISING OPTIONS TO PURCHASE AIRLINE TICKETS

[75] Inventors: Jay S. Walker, Ridgefield; T. Scott Case, Darien; James A. Jorasch, Stamford; Thomas M. Sparico, Riverside, all of Conn.

[73] Assignee: Walker Asset Management Limited Partnership, Stamford, Conn.

[21] Appl. No.: 775,591

[22] Filed: Dec. 31, 1996

[51] Int. Cl.[6] .................................................. G06F 17/60
[52] U.S. Cl. .................................................. 705/5; 705/37
[58] Field of Search .................................................. 705/5, 37

[56] References Cited

U.S. PATENT DOCUMENTS

| | | | |
|---|---|---|---|
| 4,766,539 | 8/1988 | Fox | 364/401 |
| 4,885,685 | 12/1989 | Wolfberg et al. | 364/401 |
| 5,203,620 | 4/1993 | McLennan | 312/334.46 |
| 5,483,444 | 1/1996 | Heintzeman et al. | 364/401 |

OTHER PUBLICATIONS

M2 Presswire, "Economic Research Service", Sep. 25, 1996.
Randall Bloomquist, The Washington Post, Conference of A Consumer Electronics Salesman, Aug. 28, 1996, p. R05.
D. K. Piot, The Christian Science Monitor, "Bad News For Travelers", Nov. 17, 1980, p. 3.
Risk Management Agency Research and Evaluation Division Pilot Programs, Oct. 15, 1996, http://www.act.fcic.usda.gov/research/pilots.html.
Croprevenue Coverage and Income Protection, http://www.agribiz.com/fbFiles/readings/IPFCIC.html.

*Primary Examiner*—Edward R. Cosimano
*Assistant Examiner*—Barton L. Bainbridge
*Attorney, Agent, or Firm*—Fitzpatrick, Cella, Harper & Scinto; Jeffrey L. Brandt

[57] ABSTRACT

An apparatus, method, and program for determining a price of an option to purchase an airline ticket, and for facilitating the sale and exercise of those options. By purchasing an option, a customer can lock in a specified airfare without tying up his money and without risking the loss of the ticket price if his travel plans change. Pricing of the options may be based on departure location criteria, destination location criteria, and travel criteria.

28 Claims, 6 Drawing Sheets

METHOD, APPARATUS, AND PROGRAM FOR PRICING, SELLING, AND EXERCISING OPTIONS TO PURCHASE AIRLINE TICKETS

BACKGROUND OF THE INVENTION

The present invention relates to the field of pricing and selling airline tickets.

Airfares, especially in the highly competitive United States market, are constantly changing, with the availability of seats at any given fare level changing from one day to the next. For example, a seat for $249 for a particular flight on a particular date might be available one minute, be gone the next minute, and temporarily reappear ten minutes later before disappearing forever.

Many travelers would like to book their tickets early to lock in a low price, because only a limited number of deeply discounted advanced purchase seats are available on any given flight. Buying a ticket far in advance to lock in a low airfare, however, ties up the customer's money until the ticket is used. In fact, if the customer buys a non-refundable ticket, he cannot get this money back if he cancels his trip. If the customer finances his purchase on a credit card, he may incur significant interest charges between the purchase date and the flight date. In addition, buying a ticket in advance does not even guarantee that the customer will get his ticket at the lowest possible price—a fare war may break out after the customer buys his ticket.

As an alternative to purchasing tickets far in advance of the travel date, some travelers will delay purchase in the hope that a fare war will break out, so that they will be able to find a deeply discounted fare that fits their travel plans. Waiting and hoping for a fare war, however, is a very risky solution. If a fare war does not materialize, the customer is forced to choose between paying the full, non-discounted price and foregoing the trip altogether.

Until now, there has been no suitable way to minimize these drawbacks and enable the customer to lock in a low airfare without tying up his money.

Option contracts ("options"), are known in other fields as a way of locking in a particular purchase price for a given commodity. Because of this, options can be used by buyers to minimize the risk of rising prices.

One of the most widely known types of options is the covered option to purchase stock. The issuer of this type of option owns a number of shares of a particular stock. The buyer of this type of option has the right to purchase, from the issuer of the option, a predetermined number of shares of the stock, at a predetermined price, at any time before the option expires. For example, if A owns 100 shares of XYZ stock, A can sell an option to B that gives B the right to buy A's stock for $10 per share at any time before a predetermined expiration date. If the option is exercised, the seller receives the pre-agreed purchase price in exchange for the stock. If the option expires unexercised, the seller retains the stock and can sell another option on the same stock.

Covered options are not limited to the stock market—they have been used to purchase various other commodities as well. For example, if A owns an ounce of gold, A can sell an option to B, for $50, which gives B the right to buy A's ounce of gold for $400. If, before the option expires, B decides that he wants to buy A's gold, B exercises his option and pays A $400 for the gold. If B decides that he does not want to buy A's gold, B does nothing. Because B is not bound to buy A's gold, if the market price of gold falls below $400, B will not want to exercise his option—he will buy the gold on the open market. No matter what B does, however, A retains the $50 purchase price of the option.

Options are oft en used in areas where the price of the underlying commodity (such as the stock or the gold) is volatile. The option purchaser benefits by obtaining a guarantee that he will be able to buy the commodity at a price that he can afford. The option seller benefits by receiving the purchase price of the option.

Until now, however, there has been no acceptable way to minimize the risk of fluctuations in airline ticket prices. In particular, as far as we are aware, options to purchase airline tickets have never been sold. Moreover, no systems have been developed for determining prices for options on airline tickets, and keeping track of the sale and exercise of those options.

SUMMARY OF THE INVENTION

The present invention advantageously fills the aforementioned deficiency in the prior art by providing a method, apparatus, and program for pricing, selling, and exercising options to purchase airline tickets.

The invention advantageously enables ticket buyers, for a nominal premium, to lock in a guaranteed price at which they can purchase an airline ticket, without committing themselves to purchasing the ticket, without tying up the full purchase price of the ticket, and without putting the full purchase price of the ticket at risk in case the customer's travel plans change.

The invention also advantageously provides the seller with an opportunity to profit by selling options to buy airline tickets.

In particular, one aspect of the present invention is directed to a method of pricing options to purchase airline tickets. This method includes inputting information specifying where a customer wishes to depart from and where he wishes to fly to, and at least one time when the customer desires to travel. A price for an option that gives the customer a right to purchase a ticket to fly from the origin to the destination during a desired time is calculated and output. The purchase price of the ticket is one of the terms of the option.

Other aspects of the present invention are directed to a computer program and an apparatus corresponding to the method previously described and to an embodiment using a central controller and a number of agent terminals.

DETAILED DESCRIPTION OF THE PREFERRED EMBODIMENTS

The present invention is directed to a system for determining an appropriate price for options to purchase airline tickets, and facilitating the sale and the exercising of those options.

Traditional methods of determining prices for options on stocks and traditional commodities are not suitable in the airline ticket market, due the unique nature of airline tickets. To begin with, (1) the product (i.e., an airline trip) is only supplied by a limited number of airlines; (2) the product is not completely fungible, because certain customers may prefer flying on a particular airline, or through certain gateway airports predominantly served by one or two airlines; and (3) the supply of the product is small, because only a limited number of seats are available on any given flight.

The use of options for airline tickets is further complicated (when compared to stocks and traditional commodities) by the fact that the travel plans of different airline passengers have different degrees of flexibility. An example of one extreme case would be a business traveler flying from Washington DC to New York who wants to travel on a particular day, at a particular time, and on a particular airline in order to attend a scheduled meeting in New York. This pasanger's travel plan has virtually no flexibility.

An example of the other extreme is a passenger with very high flexibility. This could be a passenger from Washington DC who wishes to fly to Los Angeles for a vacation weekend. This passenger may not care whether he flies out of National airport or Dulles airport, and may not care which airline he uses. He may not care at what time he departs on Friday, and may even be willing to fly out on Thursday. A passenger with a sufficiently flexible schedule may even be willing to fly out on a different weekend in the same month. This type of passenger is free to choose the flight with the lowest fare from among a large selection of flights.

The underlying commodity is well defined for an option to buy an airline ticket for the first type of customer—it is a ticket on a particular flight. Pricing this type of option, however, is not straightforward because the option price will depend on a number of factors that are not present in other commodities. For example, the price of an option on a particular flight may depend upon the date and time of the flight, the day of the week, the weather, special occurrences in one of the cities (such as the Olympics) and numerous other factors.

Determining a price of an option for the second type of customer is even more complicated because the underlying commodity is not well defined: The item that will ultimately be delivered to the customer, should he exercise his option, could be a ticket on any number of flights. Accordingly, pricing the option could depend on each of the aforementioned factors for each of the flights on which the customer may fly. The present invention addresses these issues.

Figure 1:
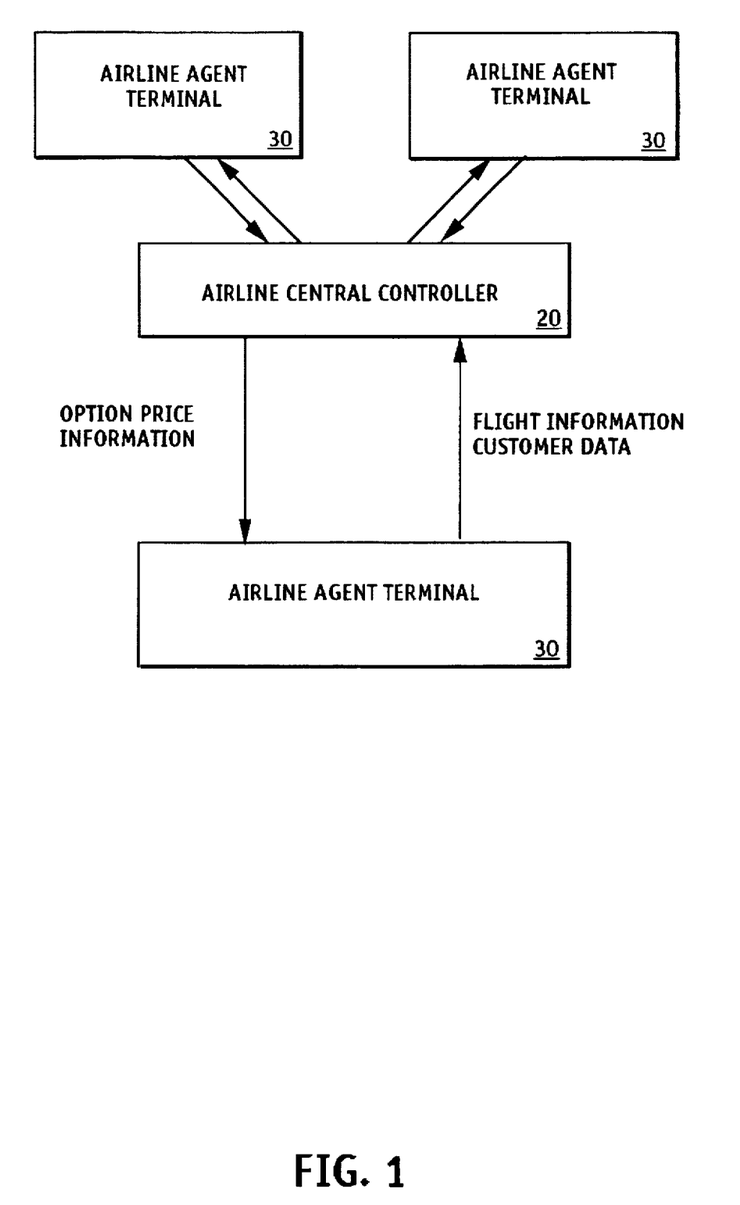
FIG. 1 is an overall system block diagram of a preferred embodiment of the present invention.

FIG. 1 is an overall system block diagram of a preferred embodiment of the present invention. In this embodiment, an airline central controller 20 is linked up to at least one airline agent terminal 30. Three agent terminals are depicted in FIG. 1, but any number of agent terminals can be used. The link between the agent terminal 30 and the central controller 20 does not have to be a physical link—it can, for example, be a link via modem, as described in the subsequent description, or any other link. An option transaction can be initiated from any one of the agent terminals 30. The information required to implement the transaction is passed between the agent terminal 30 and the central controller 20, until the transaction is complete. The central controller keeps track of all transactions, including option transactions, in the system.

The system depicted in FIG. 1 may be embodied in hardware specifically provided to implement the present invention. Alternatively, the system may be implemented using the infrastructure that already links the airlines to the travel agents. In particular, many travel agents are already linked to computerized reservation systems sponsored by various airlines, such as American Airlines (SABRE), United Airlines (APOLLO), and Trans World Airlines (PARS). The hardware and communication links of these systems may be used as an infrastructure for the present invention. Changes to the existing central controllers to incorporate the subject invention may be accomplished in various ways, such as by reprogramming an existing file server or by adding an additional file server (with or without a CPU dedicated to option transactions). Alternatively, the subject invention may be implemented using existing hardware entirely, making appropriate software updates.

Figure 2:
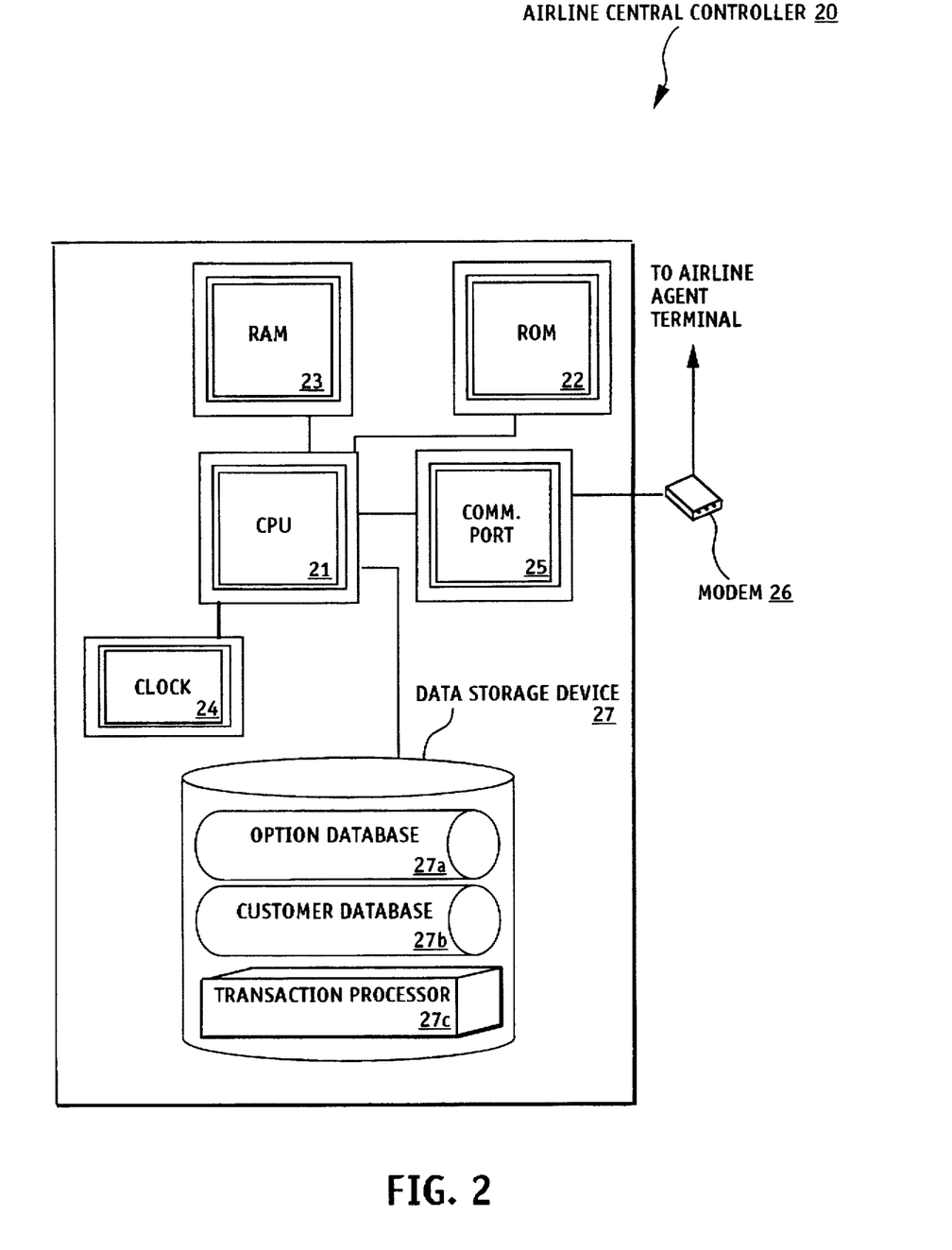
FIG. 2 is a block diagram of the central controller.

FIG. 2 is a block diagram of a preferred central controller 20. The central controller includes a CPU 21 which performs the processing functions of the controller. It also includes a read only memory 22 (ROM) and a random access memory 23 (RAM). The ROM 22 is used to store at least some of the program instructions that are to be executed by the CPU 21, such as portions of the operating system or BIOS, and the RAM 23 is used for temporary storage of data. A clock circuit 24 provides a clock signal which is required by the CPU. The use of a CPU in conjunction with ROM, RAM, and a clock circuit is well known to those skilled in the art of CPU based electronic circuit design.

The central controller 20 also includes a communication port 25 which enables the CPU 21 to communicate with devices external to the central controller 20. In particular, the communication port 25 facilitates communication between the modem 26 and the CPU 21, so that information arriving from the modem 26 can be processed by the CPU 21, and the CPU 21 can send information to remote locations via the modem 26.

While the illustrated embodiment uses a modem 26 to communicate with devices outside the central controller 20, it should be understood that other methods of communicating with external devices may be used instead of a modem. These other methods include hard-wired connections, radio communications, optical communications, and the like.

The CPU 21 can also store information to, and read information from, the data storage device 27. This data storage device 27 includes an option database 27a and a customer database 27b, which are described below. In addition, it includes transaction processor instructions 27c which can be read by and executed by the CPU 21, thereby enabling the CPU 21 to process transactions. While FIG. 2 depicts separate option and customer databases, a single database that incorporates both of those functions can also be used.

Figure 3:
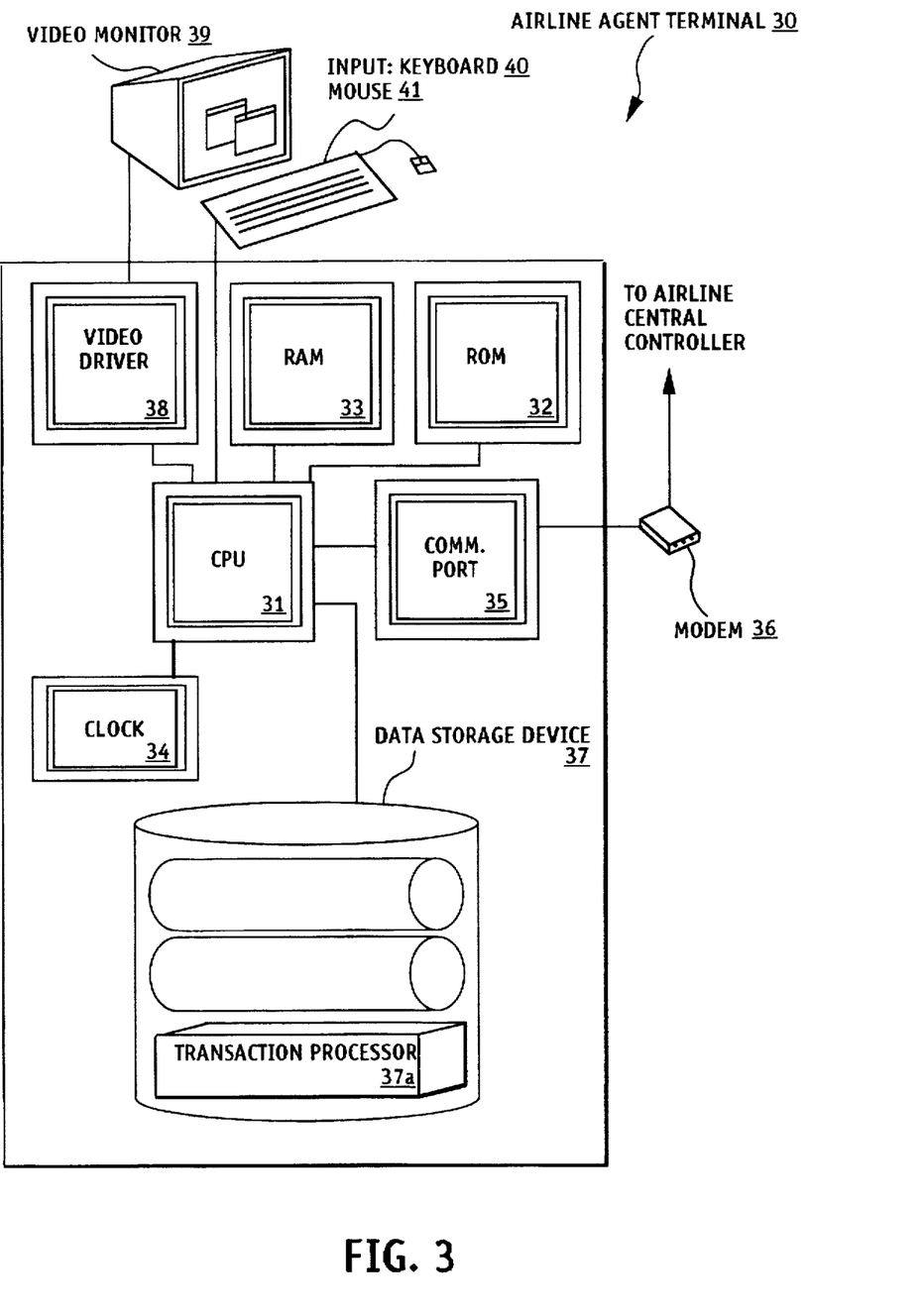
FIG. 3 is a block diagram of the agent terminal.

FIG. 3 is a block diagram of a preferred agent terminal 30, which can be located at a travel agency, an airline ticket desk or office (located at or distal from an airport), a travel membership service provider, a private home, or a credit card company, by way of example. As discussed above, there can be any number of agent terminals 30 linked up to one central controller 20. Like the central controller 20 described above, the agent terminal 30 includes a CPU 31, ROM 32, RAM 33, and a clock circuit 34. The agent terminal 30 also includes a communication port 35 which interfaces with a modem 36 that facilitates communication between the agent terminal 30 and the central controller 20. Of course, instead of the modem 36 depicted in the figure, other ways of communicating can be used, as described above for the central controller 20. A standard computer, such as an IBM PC or an Apple Macintosh, running appropriate custom-designed software, may be used as the agent terminal. Existing airline ticketing terminals may also be used, including terminals from the SABRE, APOLLO, and PARS systems described above. Alternatively, a dedicated, stand-alone agent terminal may be used.

The agent terminal 30 also includes an input device 40 to receive input from an operator. Any of a wide variety of input devices would be suitable for this purpose, including, for example, keyboards, mice, touchscreens, and the like. The input device 40 may interface directly with the CPU 31, as shown in the figure. Alternatively, an appropriate interface circuit may be placed between the CPU 31 and the input device 40.

The agent terminal 30 also includes a video monitor 39 for conveying information to the operator. While the most preferred video monitor 39 is a CRT, other video display devices, including LCD, LED, and thin film transistor panels, may be used as well. Individual indicators may also be used to convey information to the operator, including, incandescent and neon lamps, LEDs, and the like. A video driver 38 interfaces the CPU 31 to the video monitor 39 (or to any other type of video display device).

The agent terminal 30 also includes a data storage device 37, in which transaction processor instructions 37a are stored. These instructions can be read by and executed by the CPU 31, thereby enabling the CPU 31 to process transactions.

Figure 4:
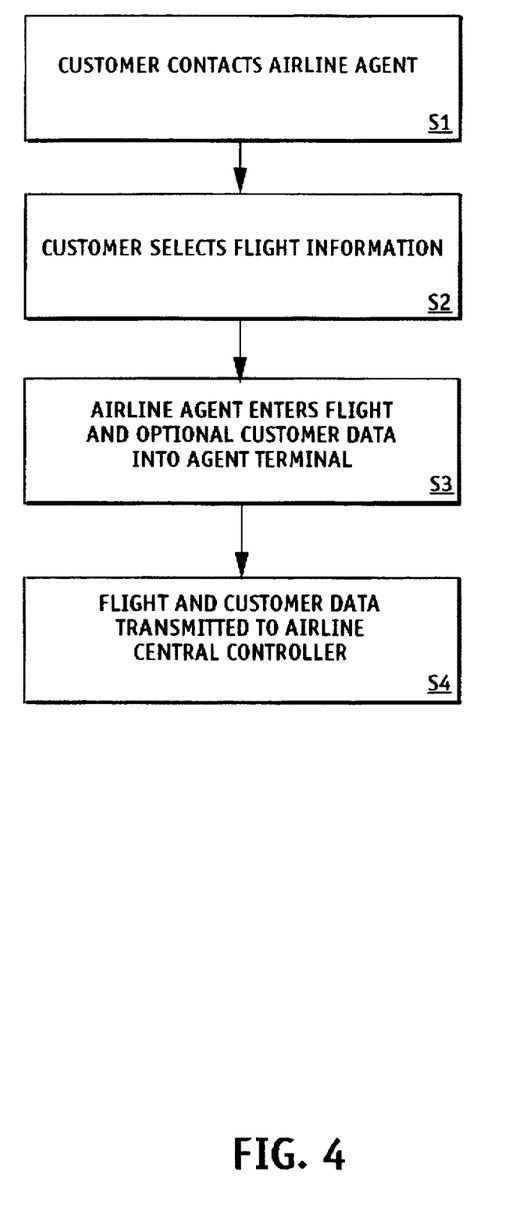
FIG. 4 is a flow chart depicting initiation of a transaction in the agent terminal.

FIG. 4 is a flow chart depicting the initiation of a transaction using an agent terminal 30. The steps of the process shown in FIG. 4 may be implemented in a computer program that may be installed at the agent terminal from, for example, a computer readable medium (such as floppy disks or CD-ROMS) which is then stored in a memory, in this case the data storage device 37 (shown in FIG. 3). Alternatively, although not so described below, the computer program may be installed at the central controller 20 from a computer readable medium and then stored therein in one or more of ROM memory 22, RAM memory 23 and data storage device 27, for access and use by agent terminals as required.

The process starts when a customer contacts an airline agent in step S1. The customer selects the flight information in step S2.

This flight information comprises three components: departure criteria, destination criteria, and travel criteria. The departure criteria defines the set of airports from which the customer is willing to depart. This set may consist of a single airport, or it may consist of a plurality of airports. For example, for a customer flying out of Washington DC who insists on flying out of National airport, the set would include only National airport. For a second customer who is more flexible, the set would include both National and Dulles airports. Similarly, the destination criteria determines the set of airports to which the customer is willing to travel. Finally, the travel criteria determines the times when the customer is willing to travel. The travel criteria may comprise a single time for each leg of the trip, or it may comprise a range of times for each leg of the trip. Optionally, additional information such as the class of the ticket (e.g. first class or coach) and seating preferences (e.g. window or aisle and front or rear of the plane) may also be considered.

The flight information is entered, by either the customer or by an agent, into the agent terminal 30 in step S3. Customer data such as the customer's name, address, and telephone number, may also be entered into the agent terminal 30 in step S3. The flight information and the customer data are then transmitted to the central controller 20 in step S4.

Returning to FIG. 3, each of the steps S1–S4 described above are executed by the CPU 31 which is executing transaction processor instructions 37a stored in the data storage device 37. The communication with the central controller 20 takes place via the communication port 35 and the modem 36.

Figure 5:
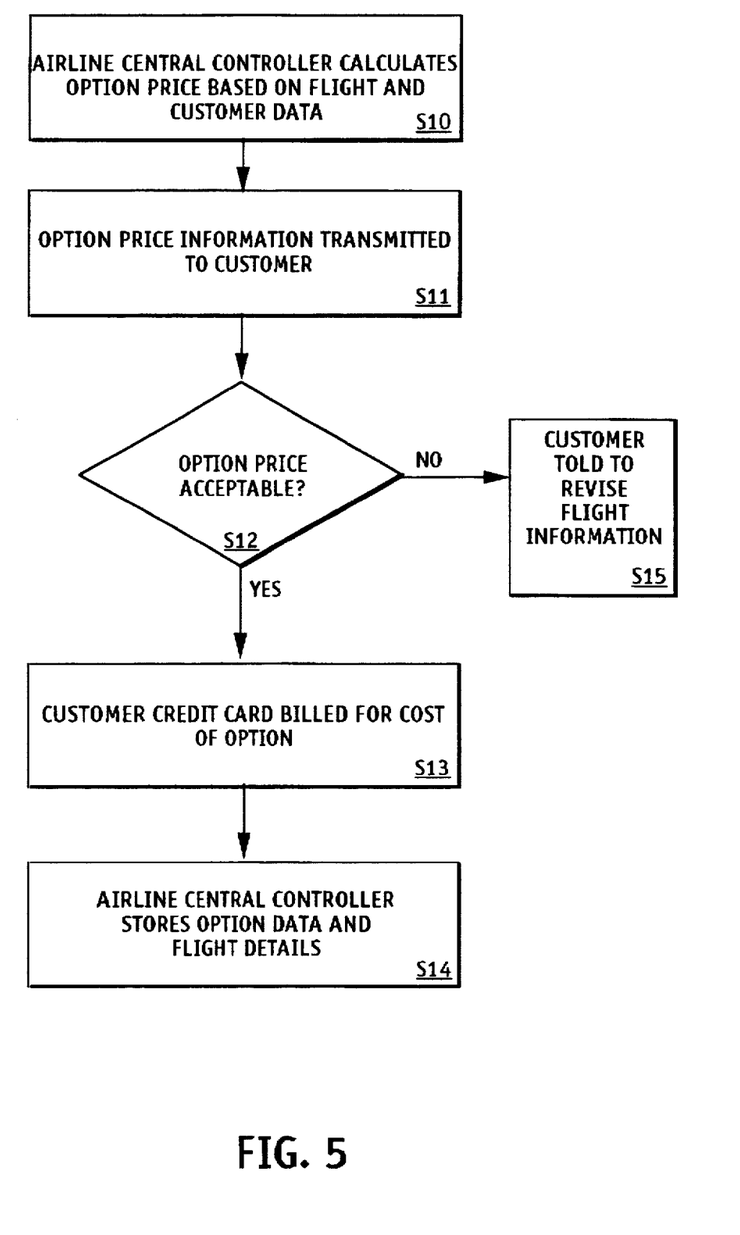
FIG. 5 is a flow chart depicting the operation of the central controller and the final phase of operation of the agent terminal.

The flight information (and optional customer data) from the agent terminal 30 is received by the central controller 20. FIG. 5 is a flowchart of the operation of the central controller 20 after receipt of flight information from the agent terminal 30. The steps of the process shown in FIG. 5 may be implemented in a computer program that may be installed at the central controller 20 from a computer readable medium and then stored therein in one or more of the ROM 22, the RAM 23, and the data storage device 27 (shown in FIG. 2) The central controller 20 calculates the price of an option in step S10 based on the flight information received from the agent terminal together with information from the option database 27a.

When the flight information includes multiple flights, the price of the option may be simply the lowest price selected from a set of individual options on each of the flights which the customer may ultimately fly on. Alternatively, that price can be discounted below that level by a predetermined percentage depending on the number of flights included in the flight information (as implemented by the factor R in the example below). A more sophisticated model could determine the probability of an empty seat on any one of a given number of flights, and compute the price of the option accordingly.

The calculation of the option price may be determined by multiplying a base option price B by those factors that will affect the value of the option. The base option price may be a fraction of the ticket price for which the option is being purchased, for example 10%. Generally, the fraction will decrease as the ticket price for which the option is being purchased approaches the full fare price. The variables used to calculate the option price from the base option price may be continuously or discretely variable. One set of suitable discretely varied variables is described in the following table, which assumes the base price is 10% of the full ticket price.

| | | | |
|---|---|---|---|
| D | A factor related to the number of days remaining before the trip. In this example, D increases as the number of days increases. | 0–10 days | 0.8 |
| | | 11–20 days | 0.9 |
| | | 21–30 days | 1.0 |
| | | 31–50 days | 1.2 |
| | | 51–100 days | 1.75 |
| | | >100 days | 2.2 |
| L | A factor related to the expected load on the subject flight. In this example, L increases as the expected load increases. | high load | 1.3 |
| | | medium load | 1.0 |
| | | low load | 0.8 |
| C | A factor related to the desirability of the customer. A discount for frequent customers could be implemented by reducing C. | VIP | 0.6 |
| | | good | 0.85 |
| | | average | 1.0 |
| | | low | 1.2 |
| R | A factor related to the rigidity/flexibility of the travel plans. In this example, R increases as rigidity increases (and as flexibility decreases). | 48 hours | 0.6 |
| | | 24 hours | 0.8 |
| | | 12 hours | 0.9 |
| | | 4 hours | 1.0 |
| | | 2 hours | 1.2 |
| | | 1 hour | 1.5 |
| V | A factor related to the historic volatility of ticket prices. In this example, V increases as price volatility (measured in standard deviations, or S.D.) increases. | 3 S.D. | 1.5 |
| | | 2 S.D. | 1.2 |
| | | 1 S.D. | 0.9 |

Using these variables, a suitable algorithm for calculating an appropriate option price is as follows:

Option Price=$B \times D \times L \times C \times R \times V$

While this equation uses a simple product of all of the aforementioned parameters, more sophisticated formulas may be used to arrive at a suitable option price.

Once the option price information has been calculated, it is transmitted to the customer in step S11. This option price information may be a single price for an option to buy, for a particular price, a ticket that matches the customer's flight information. It may also be a set of prices for each of a plurality of options that cover the selected flight information at a plurality of different ticket prices. For example, the option price information may include an option to buy a $500 ticket from New York to Chicago at an option price of $10, and also include an option to buy a $400 ticket between the same cities at an option price of $50. In such a case, using the algorithm referenced above, the base option price for the $500 ticket will be less than the base option price for the $400 ticket.

As an example, assume a customer wants to purchase an option to buy the $500 ticket. Further assume that the flight is 67 days out, a medium load factor is expected, it is a VIP customer, he has 48 hours of flexibility, and the flight's standard deviation of historic price volatility is 2. The base option price is, in this example, $500×10%=$50, and the final option price is $37.80, calculated as follows:

$$\$50 \times 1.75(D) \times 1.0(L) \times 0.6(C) \times 0.6(R) \times 1.2(V)$$

After the price information is transmitted to the customer in step S11, the customer decides whether to purchase the option in step S12. If he decides to purchase the option, the system can process the sale by billing the customer's credit card, in step S13. Of course, alternate methods of payment may be used instead of a credit card, including payment by cash, check, debit card, gift certificate, and the like. Alternatively, the airline may simply bill the customer for the price of the option.

If the customer decides not to purchase an option during step S12, the customer is given a chance to revise the flight information in step S15. By adding more flexibility to his travel plans, the customer may be able to find an option that is suitably priced. After the flight information is revised, the new flight information is processed by the system in the same way as the original flight information in order to generate a new option price.

The credit card transaction may be carried out by the central controller 20. Alternatively, the credit card transaction may be carried out by the agent terminal 30.

Transactions processed through the agent terminal 30 may be carried out using the same modem 36 that is used to communicate with the central controller 20. Alternatively, an additional modem (not shown) may be included in the agent terminal 30 to process the credit card transactions.

After the sale is completed, the option database (27a in FIG. 2) is updated in step S14 to reflect the fact that a particular option has been sold. The number of options sold for a particular flight may be used by the system as a factor in determining the price of options to be sold in the future. More specifically, when the number of options outstanding for a given flight rises, the price for subsequent purchase of similar options may be raised to compensate the airlines for the additional risk of having to sell a large number of tickets for a particular flight.

The customer database (27b in FIG. 2) may also be updated to indicate that a particular customer has purchased a given option. This customer database may be used for various purposes including billing and marketing.

Figure 6:
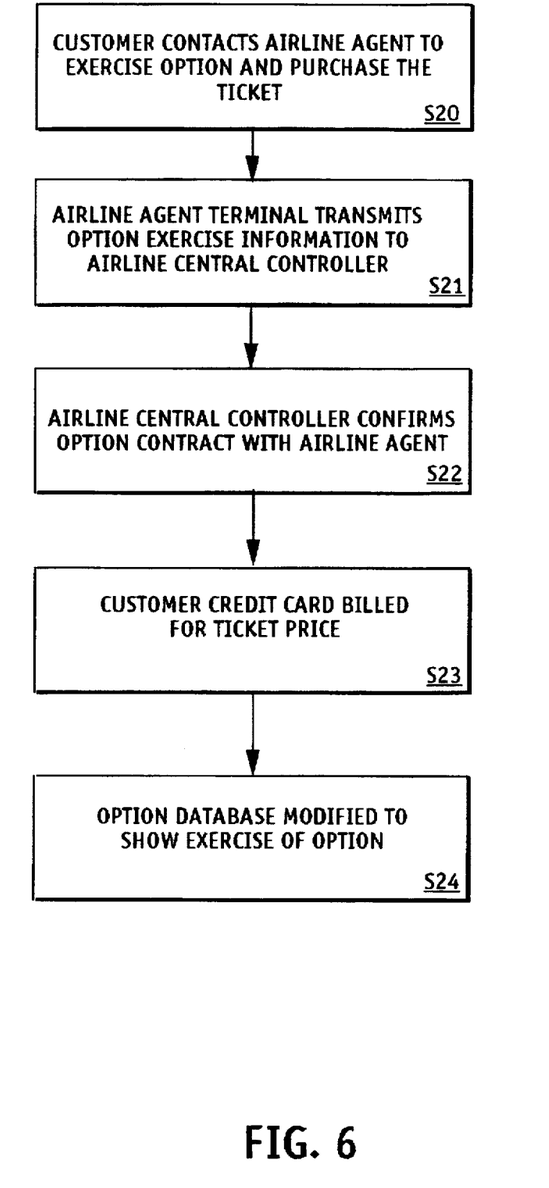
FIG. 6 is a flow chart depicting the operation of the system when an option is exercised.

FIG. 6 is a block diagram depicting operation of the system when a customer exercises an option. The steps of this process may be stored on a computer readable medium which in this case would be the data storage devices 27 and 37 (shown in FIGS. 2 and 3) First, in step S20, the customer contacts the airline agent and indicates that he wishes to exercise a previously purchased option and purchase a ticket. After the operator of the agent terminal 30 enters information describing the option, the agent terminal 30 transmits the option exercise information to the central controller 20 in step S21. The central controller 20 then confirms that the option contract does in fact exist, and is current, as shown in step S22. The customer's credit card is then billed for the ticket price specified by the option being exercised in step S23. The specifics of charging the customer for the ticket are similar to the specifics of charging him for the original purchase of the option. The option database 27a in the central controller 20 (shown in FIG. 2) is subsequently updated to show that the option has been exercised, as shown in step S24.

While the above description contemplates the sale of an option with a fixed expiration date at a particular price, alternative pricing configurations may also be used. These could include, for example, options that can be extended each month for a monthly fee. Part or all of the option price may also be credited towards the purchase of the ticket.

After an option is issued by an airline, the airline can reserve a seat on a flight covered by the option, and cancel the reservation when the option expires.

Alternatively, the airline can do nothing until the option is exercised, and at that point reserve the customer on a flight that matches the specified location and travel criteria. If this reservation results in overbooking of the flight, the airline can resort to traditional methods of dealing with overbooking, such as compensating customers that miss the flight at the airport. Alternatively, the airline can add an extra flight to provide the customer with the desired service.

The description above contemplates the use of options that are issued by the airlines themselves, which are capable of issuing the appropriate tickets when the option is exercised. It should be recognized, however, that the option need not be issued by the airlines themselves. A third party can issue the option, provided that the third party is willing to go out into the market and purchase an airline ticket if and when the option is exercised. This latter situation corresponds to a party that does not own shares of a given stock selling "naked" options on that stock.

In an alternative embodiment, the option may be replaced by an insurance policy that insures the policy-holder that he would be able to buy a ticket at a given price. The policy would indemnify the policy holder against part or all of the additional price that he might need to pay to buy the ticket. Pricing the insurance policy would be similar to pricing the options described above, and selling the policy could also be similar to selling the options described above.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A data processing apparatus for determining a price of an option to purchase an airline ticket, comprising:

a central controller including a CPU and a memory operatively connected to said CPU;

at least one terminal, adapted for communicating with said central controller, for transmitting to said central controller option pricing information including departure location criteria, destination location criteria, and travel criteria;

said memory in said central controller containing a program, adapted to be executed by said CPU, for calculating a price of an option to purchase within a future period, for a particular ticket price, an airline ticket satisfying the departure location criteria, destination location criteria, and travel criteria;

wherein said central controller receives said criteria from said terminal and calculates the option price based upon the criteria.

2. The apparatus according to claim 1, wherein said program in said memory is adapted to receive a customer request input via said terminal to purchase the option and further adapted to perform a credit card transaction to sell the option to the customer.

3. The apparatus according to claim 2, wherein said program in said memory is adapted to receive a customer request input via said terminal to exercise an option and further adapted to perform a credit card transaction to sell a ticket to the customer in accordance with the terms of the option.

4. A method of determining a price of an option to purchase an airline ticket using a central controller including a CPU and a memory operatively connected to said CPU and containing a program adapted to be executed by said CPU for determining the price of an option, and a terminal adapted for communicating with said CPU, the method comprising the steps of:

inputting departure location criteria to the controller via the terminal;

inputting destination location criteria to the controller via the terminal;

inputting travel criteria to the controller via the terminal; and calculating a price of an option that gives the customer a right to purchase within a future period, for a particular ticket price, an airline ticket satisfying the departure location criteria, the destination location criteria, and the travel criteria by having the CPU execute said program; and outputting the option price to the terminal.

5. A data processing apparatus for determining a price of an option to purchase an airline ticket, comprising:

a CPU; and a memory operatively connected to said CPU, said memory containing a program adapted to be executed by said CPU and said CPU and memory cooperatively adapted to receive option pricing information, and to calculate a price of an option to purchase within a future period, for a particular ticket price, an airline ticket satisfying the option pricing information.

6. The apparatus according to claim 5, wherein said program is adapted to receive option pricing information comprising departure location criteria, destination location criteria, and travel criteria.

7. The apparatus according to claim 5, wherein said program in said memory is adapted to receive at least one of first information describing a desired class-of-ticket, second information concerning the expected load on flights that satisfy the location criteria and the travel criteria, and third information concerning the volatility of ticket prices, and wherein said program is further adapted to use at least one of said first information, said second information, and said third information to calculate the option price.

8. The apparatus according to claim 5, wherein said program in said memory is adapted to receive an indication that a customer has purchased the option and is further adapted to update a database to reflect the sale of the option.

9. The apparatus according to claim 5, wherein said program in said memory is adapted to calculate the option price based at least in part on the number of similar options already sold, using information stored in an option database.

10. The apparatus according to claim 5, wherein said program in said memory program is adapted to calculate the option price based in part upon option pricing information that is satisfied by more than one flight on at least one leg of customer's trip.

11. The apparatus according to claim 5, wherein the said program in said memory is adapted to calculate the option price based at least in part on the formula:

$$\text{Option Price} = B \times D \times L \times C \times R \times V,$$

where B is a base price for the option, D is a factor related to the number of days remaining before the trip, L is a factor related to the expected load on the subject flight, C is a factor related to the desirability of the customer, R is a factor related to the rigidity of the travel plans, and V is a factor related to the historic volatility of ticket prices.

12. A method of determining a price of an option to purchase an airline ticket using a central controller including a CPU and a memory operatively connected to said CPU and containing a program, adapted to be executed by said CPU, for determining a price of the option, the method comprising the steps of:

inputting departure location criteria;

inputting destination location criteria;

inputting travel criteria provided by a user; and calculating the price of an option that gives the customer a right to purchase within a future period, for a particular ticket price, an airline ticket satisfying the departure location criteria, the destination location criteria, and the travel criteria, by having the CPU execute said program; and outputting the option price.

13. A method of determining a price of an option to purchase an airline ticket, comprising the steps of:

receiving option pricing information relative to the future purchase of a ticket;

calculating the price for an option to purchase within a future period, for a particular ticket price, a ticket satisfying the option pricing information; and outputting the option price.

14. The method according to claim 13, wherein the step of receiving option pricing information includes receiving departure location criteria, destination location criteria, and travel criteria.

15. The method according to claim 13, further comprising the steps of:

receiving at least one of first information describing a desired class-of-ticket, second information concerning the expected load on flights that satisfy the location criteria and the travel criteria, and third information concerning the volatility of ticket prices, and wherein said calculating step further includes utilizing at least one of said first information, said second information, and said third information to calculate the option price.

16. The method according to claim 13, further comprising the steps of receiving an indication that a customer has purchased the option and updating a database to reflect the sale of the option.

17. The method according to claim 13, further comprising the step of receiving option sales information from an option database indicating a number of similar options that have been previously sold, and wherein the calculating step uses the option sales information in determining the option price.

18. The method according to claim 13, further comprising the steps of receiving a customer request to purchase the option, receiving tender of the purchase price from the customer, performing a transaction to sell the option to the customer, and storing information regarding said option.

19. The method according to claim 18, further comprising the steps of receiving a customer request to exercise an option, performing a transaction to sell a ticket to the customer in accordance with the terms of the option, and modifying the database to reflect the sale of the ticket pursuant to the option.

20. The method according to claim 14, wherein the calculation of the option price is based in part upon option pricing information that is satisfied by more than one flight on at least one leg of a customer's trip.

21. The method according to claim 13, wherein the calculating step includes calculating the option price based at least in part on the formula:

Option Price=$B \times D \times L \times C \times R \times V$, where B is a base price for the option, D is a factor related to the number of days remaining before the trip, L is a factor related to the expected load on the subject flight, C is a factor related to the desirability of the customer, R is a factor related to the rigidity of the travel plans, and V is a factor related to the historic volatility of ticket prices.

22. Computer executable process steps operative to control a computer, stored on a computer readable medium, for determining a price of an option to purchase an airline ticket, comprising:

a step to receive departure location criteria;

a step to receive destination location criteria;

a step to receive travel criteria;

a step to calculate the price for an option to purchase, within a future period, for a particular ticket price, an airline ticket satisfying the departure location criteria, the destination location criteria, and the travel criteria; and a step to output the option price.

23. A method of pricing an option to purchase an airline ticket, comprising the steps of:

inquiring on a ticket price for an airline ticket;

receiving said ticket price;

receiving an offer to purchase for a given price an option to purchase within a particular period, for a particular ticket price, the airline ticket; and purchasing said option at said option price.

24. The method according to claim 23, further including the step of using said option to purchase the airline ticket or an equivalent of said airline ticket.

25. The method according to claim 23, wherein said step of inquiring on a ticket price includes providing travel information including departure location criteria, destination location criteria and travel criteria.

26. A data processing apparatus for selling an option to purchase an airline ticket, comprising:

a terminal adapted to communicate with a central controller that calculates a price of an option to purchase an airline ticket within a future period, for a particular ticket price, said terminal adapted to transmit to the central controller option pricing information comprising departure location criteria, destination location criteria, and travel criteria, and further adapted to receive from the central controller a price of an option satisfying the departure location criteria, destination location criteria, and travel criteria.

27. The apparatus according to claim 26, wherein said terminal is adapted to transmit a customer request to purchase the option and further adapted to perform a credit card transaction to sell the option to the customer.

28. The apparatus according to claim 27, wherein said terminal is adapted to transmit a customer request to exercise an option and further adapted to perform a credit card transaction to sell a ticket to the customer in accordance with the terms of the option.

* * * * *